INVENTOR
EDWIN R. GILL, Jr.
BY KARL W. FLOCKS
ATTORNEY

United States Patent Office 3,200,400
Patented Aug. 10, 1965

3,200,400
WIDE ANGLE HIGH FREQUENCY REFLECTING DEVICE
Edwin R. Gill, Jr., Millerton, N.Y., assignor to Karl W. Flocks, Washington, D.C.
Filed Aug. 19, 1960, Ser. No. 50,779
4 Claims. (Cl. 343—18)

The present invention relates to reflecting devices, and has particular reference to a sheet or tape of a particular configuration which acts as a universal direction reversing device for both light and for high frequency electronic waves, such as those used in radar.

Prior devices in the field of this invention are usually characterized by relatively massive and rigid structures involving sheet metal housings, nuts, bolts and other mechanical fastenings, transparencies of glass or stiff plastics, and other features foreign to this invention.

Accordingly, the present invention is directed to providing an article in the form of a relatively thin flexible sheet having a plane front surface and a substantially plane back so that it may be affixed or mounted with a suitable adhesive, and a mosaic of triple mirrors located between the front and back surfaces primarily adapted to reflecting microwaves back to their source regardless of the angle of incidence.

Also, it is an object of this invention to provide for reflecting back to their source the high frequency waves by means of an article made in a manner so that it can be cut to size and shape by a knife or shears and otherwise installed without the use of special tools or skill.

Another advantage of this article is that it may be stored or shipped, rolled up in convenient packages.

It is a further object of this invention to provide a device capable of simultaneously reflecting microwaves and ordinary light back to their source. Such a structure is advantageous, for instance, when it is required to provide a target for radar beams at a distance and visible light at short ranges.

A further advantage of the structure of this invention is the fact that it will reflect high frequency beams incident on either its front or back surface back to their source. While in many instances this is a desirable and valuable feature, in certain cases this ability to respond to incident beams from either side may actually be undesirable. Therefore, it is also the object of this invention to provide a structure having the ability to reduce or eliminate the reflection of incident microwaves from one surface while the functional ability of the other side remains unimpaired.

Figure 1:
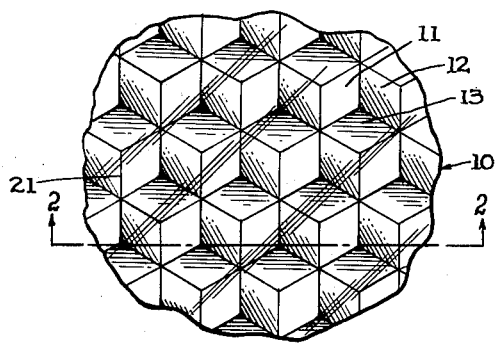
Figure 2:
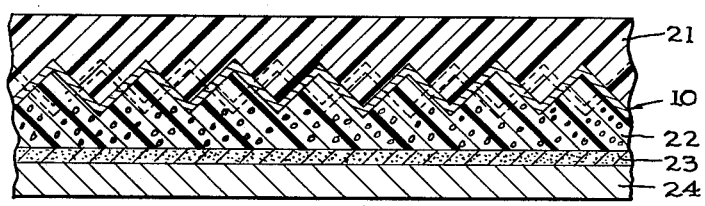

The above and other objects and advantages of the invention will become apparent upon full consideration of the following detailed description and accompanying drawings in which:

FIG. 1 is a plan view of an embodiment of the invention showing a sheet of high frequency universal direction reversing material; and FIG. 2 shows the reflecting material of FIG. 1 in an enlarged section along line 2—2.

Referring first to FIG. 1 there is shown a view of sheet 10 of material with a surface having a mosaic mirror pattern of triangular configuration with triple mirror faces 11, 12 and 13. A configuration of this type exhibits what is known as "universal direction reversal" which is described as the property of reversing the direction of incident light or other high frequency waves regardless (within limits) of the angle of incidence. Sheet 10 is preferably of a metallic material used in a very thin sheet form, $\frac{1}{10}$ of a mil thickness ordinarily being ample. Although silver or aluminum are preferred for this use, copper or another metal which is a good conductor of electricity at ultra and super high frequencies may also be used. Also, a plating of silver over some other substance would also work equally well.

This thin layer of metallic material or metallic plated material in the form of a sheet 10 is placed between other layers of different material as shown in the sectional view of FIG. 2. Layer 21 is a face or front layer of a suitable transparent material of a plastic composition. The transparency of layer 21 to light waves is necessary only if universal direction reversing of light waves is required, otherwise a non-metallic or non-conducting material is all that is required. Direction reversal of microwaves alone does not require that layer 21 be transparent to light waves. In a preferred embodiment front layer 21 is molded on to metallic sheet 10 and constitutes a single piece therewith. Backing or base layer 22, which may also be transparent when required, is molded or cemented onto the back of the metal sheet 10 to protect the metal against corrosion and also to provide a plane back upon which adhesive 23 may be applied in order to hold the reflecting material of this invention to a supporting surface 24.

As stated previously, front layer 21 may or may not be transparent as desired. When layer 21 is transparent the invention is then capable of simultaneously auto-collimating microwaves and ordinary light.

Another embodiment of this invention pertains to a change in the dielectric constant of layer 21. It has been found that the higher the dielectric constant of layer 21, the greater is the angle of incidence at which universal direction reversing is possible. One means of obtaining this higher dielectric constant is by adding a material of high dielectric constant to the plastic material of layer 21. Such a material, for example, could be the titanates of barium and strontium, either as ceramics or otherwise, or even titanium dioxide alone.

Another embodiment of the invention involves the universal direction reversing of high frequency waves incident on either the front or back surface of sheet 10. This function may readily be demonstrated by the structure described above. In certain cases this may be undesirable and therefore still another embodiment of this invention reduces or entirely eliminates the ability of the structure of this invention to reflect incident microwaves from one direction while the functional ability of the other side of the structure remains unimpaired. One way in which this may be accomplished is by dispersing a quantity of powdered metal or flaked metal in the plastic which forms the surface layer on the side on which it is desired to eliminate reflective activity. For instance, if it was found to be undesirable that reflection of microwaves or other high frequency waves take place off the back of the described structure, then a powdered or flaked metal would be added to the plastic which forms layer 22.

It will be apparent that an advantage of the present invention lies in its flexible structure which provides an adaptability in mounting on curved or cylindrical surfaces. Such use is likely to occur wherever radar targets are used as aids to navigation, or in space travel and missile work.

Preferred embodiments of the invention have been described. It should be understood, however, that the specific structure herein illustrated and described is intended to be representative only, as changes may be made therein without departing from the clear teachings of the invention. Accordingly, reference should be made to the following claims in determining the full scope of the invention.

What is claimed is:
1. A high frequency reflecting device comprising a sheet of flexible electrical conductor material so shaped as to reflect high frequency waves in the general direction of their source, a first layer of a flexible plastic material of high dielectric constant covering one surface of said sheet of material, said first layer of plastic material including titanates of barium and strontium, a second layer of a flexible plastic material covering the opposite side of said sheet of material, and a layer of adhesive material on said second layer of plastic material on the side opposite that in contact with said sheet of electrical conductor material, whereby said sheet of electrical conductor material and said first and second layers of plastic material forming a flexible sheet can be mounted on surfaces of different configuration.

2. A high frequency reflecting device comprising a sheet of flexible electrical conductor material so shaped as to reflect high frequency waves in the general direction of their source, a first layer of a flexible plastic material of high dielectric constant covering one surface of said sheet of material, said first layer of plastic material including titanium dioxide, a second layer of a flexible plastic material covering the opposite side of said sheet of material, and a layer of adhesive material on said second layer of plastic material on the side opposite that in contact with said sheet of electrical conductor material, whereby said sheet of electrical conductor material and said first and second layers of plastic material forming a flexible sheet can be mounted on surfaces of different configuration.

3. A high frequency reflecting device comprising a sheet of flexible electrical conductor material so shaped as to reflect high frequency waves in the general direction of their source, a first layer of a flexible plastic material of high dielectric constant covering one surface of said sheet of material, a second layer of a flexible plastic material covering the opposite side of said sheet of material, metal particles dispersed in said second layer of plastic material, and a layer of adhesive material on said second layer of plastic material on the side opposite that in contact with said sheet of electrical conductor material, whereby said sheet of electrical conductor material and said first and second layers of plastic material forming a flexible sheet can be mounted on surfaces of different configuration.

4. A high frequency reflecting device comprising a sheet of flexible electrical conductor material so shaped as to reflect high frequency waves in the general direction of their source, a first layer of a flexible plastic material covering one surface of said sheet of material, said first layer of material including means to increase the dielectric constant of said plastic material, a second layer of a flexible plastic material covering the opposite side of said sheet of material, and a layer of adhesive material on said second layer of plastic material on the side opposite that in contact with said sheet of electrical conductor material, whereby said sheet of electrical conductor material and said first and second layers of plastic material forming a flexible sheet can be mounted on surfaces of different configuration.

References Cited by the Examiner
UNITED STATES PATENTS

| | | | |
|---|---|---|---|
| 2,294,930 | 9/42 | Palmquist. | |
| 2,310,790 | 2/43 | Jungerson | 343—18 |
| 2,380,447 | 7/45 | Jungersen | 88—78 |
| 2,543,800 | 3/51 | Palmquist et al. | 88—82 |
| 2,580,921 | 1/52 | Iams | 343—18 |
| 2,791,767 | 5/57 | Oberg | 343—18 |
| 2,948,896 | 8/60 | Hart | 343—18 |
| 2,951,246 | 8/60 | Halpern | 343—18 |
| 3,065,559 | 11/62 | McKenzie | 88—82 X |

CHESTER L. JUSTUS, *Primary Examiner.*

FREDERICK M. STRADER, *Examiner.*